Patented Oct. 2, 1945

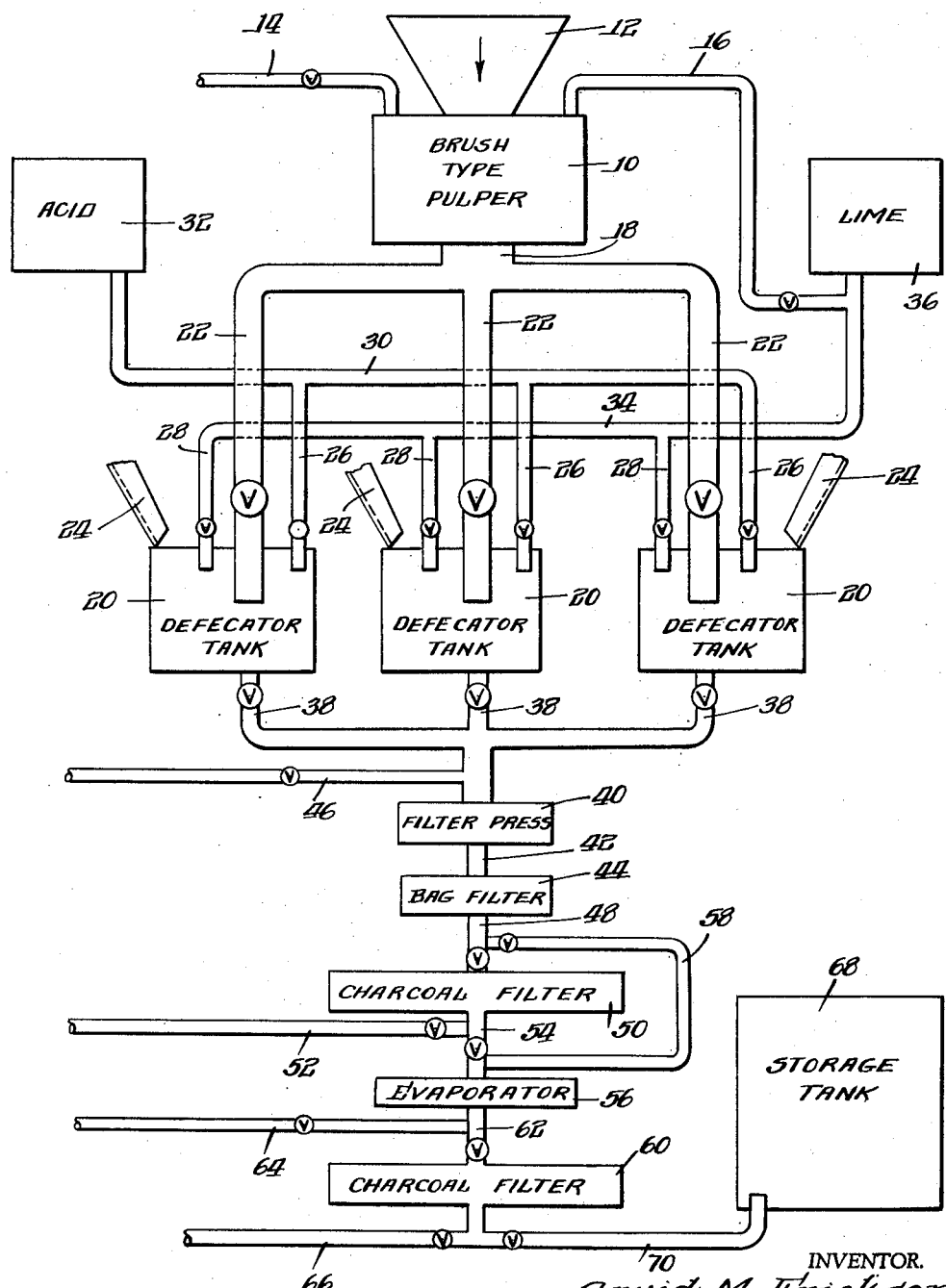

2,385,801

UNITED STATES PATENT OFFICE 2,385,801

PREPARATION OF A SWEETENING MEDIUM FROM FRUIT

Arvid M. Erickson, San Jose, and John D. Ryan, Campbell, Calif., assignors to Barron-Gray Packing Company, San Jose, Calif., a corporation of California Application March 16, 1942, Serial No. 434,852

10 Claims. (Cl. 127—50)

This invention relates to the preparation of sweetening media from sugar containing material. More particularly, it relates to an improved method for preparing sweetening media from fruit.

It is an object of the present invention to provide an improved and simplified method for preparing a sweetening medium from fruit.

A further object is to provide a process for preparing a sweetening medium from fruit, in which the purifying reagents are added to the pulp instead of to the separated juice and in which the sweetening medium is isolated from the pulp in a single filtration, leaving both impurities and other non-sugar portions of the fruit behind.

Other objects will appear hereinafter.

It has been found that the foregoing objects may be accomplished by treating fruit pulp, having a suitably low content of impurities and coloring matter, with certain divalent alkaline materials in sufficient quantity to materially increase the pH of the pulp and give the pulp a pH in the range from about pH 4 to about pH 8.7, preferably below about pH 7, then adding a suitable acid in sufficient quantity to materially reduce the pH of the pulp to a pH in the range from about pH 4 to about pH 6.3 and precipitate impurities, thereafter again raising the pH of the mixture with the alkaline material to a pH in the range from about pH 6.7 to about pH 8.7, at which upon filtration a filtrate of the desired purity and clarity is obtained, and after the reactions are complete separating the material precipitated, together with the insoluble non-sugar portions of the pulp, in a single step by filtering or centrifuging, or any other desired means to yield a sweetening medium.

Provided the over-all percentage of impurities and coloring matter is not too great in the particular batch, the present invention may be applied generally to the treatment of fruit materials containing different amounts and different kinds of sugars and/or impurities, and to mixtures of different kinds of fruits, for example, a mixture of fruits in the proportions in which they are packed in a single pack or during a whole operating season. By way of illustration, if, during the operating season, the total pack should be seventy per cent pears, twenty per cent peaches, and ten per cent grapes, the non-canning good portions of these fruits, which are normally wasted, could be blended in this ratio before processing.

Certain available fruit materials contain sufficiently small percentages of impurities and coloring matter so that they may be directly processed by the simplified method described in the preceding paragraph. As a rule, fruit materials having the greatest percentage of total sugars are freer from impurities than those having lower sugar content and thus are included in the materials which may be advantageously handled as described herein. Other fruit materials, which in the form in which they are available contain too high a percentage of impurities and coloring matter to permit of their being processed directly in accordance with the simplified method of the present invention, may be readily put into proper condition for such simplified processing in one of two ways. Thus it has been found that the skins, seeds, cores, and certain other portions of fruit, are a major source of impurities and coloring matter, and that if these are eliminated as, for example, by mechanical separation, the remaining material may then be processed for the precipitation of soluble impurities in accordance with the present invention. Also, since fruit materials containing different percentages of impurities may be blended together for treatment, fruit material, which is too impure to permit of its being processed satisfactorily alone by the method of this invention, may be blended with other sugar bearing fruit material containing a substantially lesser percentage of impurities and coloring matter so that the percentage of impurities and coloring matter in the mixture is sufficiently low to permit of its being processed as described herein.

Because of the rather wide variation in the kind and amount of impurities found in various fruit materials, no exact line can be drawn between materials which may be treated by the process of this invention satisfactorily and those which may not, on the basis of percentage of impurities present. It may readily be determined, however, by a simple test in a given case whether the fruit material may be satisfactorily processed by this invention or whether it requires the more severe treatment specifically set forth in the copending application referred to above. Such a test would consist simply in carrying out the process of this invention on a small sample of the fruit material and then determining by analysis whether the product is a sweetening medium or is still too impure to be satisfactory.

It is possible to treat fruit material, such as whole fruits or fruit wastes, by the process of this invention without removing the skins, seeds, cores, et cetera, but their removal is desirable not only to avoid the introduction of difficultly removable impurities and coloring matter but also because it removes from the product the stigma of being made from waste matter. When the skins, seeds, cores, et cetera, are removed prior to treatment the sweetening medium product is then derived from the juice and unused flesh portions of the fruit.

The mechanical separation of the skins, seeds, cores, et cetera, of whole or unused portions of fruit may be readily accomplished by passing the fruit through a brush-type pulper or other equivalent separating device. In a brush-type pulper the skins, seeds, cores, et cetera, are retained and the liquid and flesh portions of the fruit, including the sugars, are passed through, together with any liquid present, without subjecting the skins, seeds, cores, et cetera, to pressure which tends to free impurities or coloring matter found therein. In this manner the addition of certain coloring matter, which subsequently has to be removed from the syrup, as well as the addition of difficultly removable impurities which require liming to a high pH in order to effect their elimination, is avoided, but substantially none of the sweetening ingredients are lost.

Fruits in general and particularly dried fruits, such as raisins, do not contain enough natural water to dissolve all the soluble sweetening ingredients present in the fruit material. Since the sweetening ingredients of the fruit are separated from the undesired portions thereof in a filtration step in the form of an aqueous solution, it is important that sufficient water be present to dissolve all the sweetening ingredients if maximum extraction of these ingredients is to be obtained. Addition of water as such is not necessary, however, because both the alkaline and acidic reagents are preferably added in the form of dilute aqueous solutions, and the necessary quantity of water may be added in this form provided the solutions are sufficiently dilute. In accordance with the preferred form of the invention, the first quantity of alkaline material added to the fruit material is made sufficiently dilute to provide the appropriate amount of water. This is desirable to produce a thorough admixture of the alkaline material with the fruit material and to avoid local high concentrations of alkaline material. In some cases, for instance, in the case of dried fruits, it may be desirable to add water as such. If so, it is preferred that this water be added prior to grinding the fruit material to a fine pulp. The presence of water during grinding assists the grinding operation and helps to prevent darkening of the fruit due to air oxidation. Another desirable feature of the addition of water prior to grinding is that it renders the fruit material more fluid and thus makes it easier to handle.

In the preferred form of the present invention raw fruit, such as peaches, pears, apples, grapes, and the like, or dried fruit, such as raisins and prunes, or the wastes from fruit packs, such as the wastes from packing peaches or the waste from packing mixed fruit, known as fruit salad or fruit cocktail, or other fruit wastes, or mixtures of two or more of the foregoing, is ground to a fine pulp in a suitable pulper of which a number are available, water, as such or containing alkaline material, being preferably added first, particularly in the case of dried fruits, as described more fully elsewhere herein. Where the fruit contains too large quantities of impurities or coloring matter to permit of its being processed as such, it is blended before or after grinding with other fruit of higher purity in sufficient quantity to increase the over-all purity to the point where it can be processed as described herein. Where skins, seeds, cores, et cetera, are to be removed, the fruit is either ground in a brush-type pulper or is put through such a pulper subsequent to grinding to separate the skins, seeds, cores, et cetera, from the remainder of the pulp.

Before or after grinding the fruit to a fine pulp, as described, a suitable alkaline material is added to it in an amount sufficient to raise the pH to within the range from about pH 4 to about pH 8.7, preferably below about pH 7 as described above. In accordance with the preferred procedure, the quantity of alkaline material added is that which is just sufficient to give the finely ground fluid pulp the optimum pH within this range, which optimum pH will usually lie between about pH 5.3 and about pH 6.7. This optimum pH frequently varies with different batches of fruit. It depends to some extent on the original pH of the mixture, as well as upon other factors, such as the nature of the material being treated. It may be readily determined in any given instance, however, by a simple test, as described hereinafter.

While as set forth in the preceding paragraph it is preferable to increase the pH initially to a pH of about 7 or below (particularly where lime is the alkaline reagent used) it has been found that in some cases the fruit is not pulped up sufficiently at such a pH to break all the juice cells and raising the pH only up to 7 or below results in a final composition having a pH lower than is required to give the maximum increase in sugars purity. With such fruit materials it has been found desirable to add enough alkaline material to raise the pH slightly above the optimum within the range from about pH 4 to about pH 7 at which a maximum of impurities is precipitated without substantial darkening of the juice even though this may mean increasing the pH above 7 or even up to about pH 8.7 or above and may result in darkening the juice somewhat. Any resulting increase in the cost of color elimination is offset by the improvement in purity of the final product. Thus where the juice cells of a particular fruit composition are not substantially all cracked at the optimum pH for impurity elimination without substantial darkening the alkaline material is preferably added in an amout sufficient to increase the pH above the optimum to the pH where substantially all the juice cells are cracked so as to insure the freeing of acids locked within the uncracked cells. With fruit compositions substantially all the cells of which are cracked at a pH of 7 or below, however, or at the optimum pH below 7 for impurity elimination without substantial darkening, it is preferable to hold the pH below 7 or at the optimum as the case may be.

Suitable alkaline materials with which to increase the pH are alkaline defecating agents, that is, alkaline materials which can be readily eliminated from the mixture at a later stage of the process and which are also capable of precipitating undesired impurities. Divalent alkaline materials, and particularly the alkaline earth metal oxides and hydroxides, such as the oxides and hydroxides of barium, calcium, strontium, and magnesium, have been found to possess the desired properties. The preferred divalent alkaline material is lime but other divalent alkaline materials, both organic and inorganic, may be used.

Following the addition of the alkaline material the pulp is acidified with a suitable acid, such as phosphoric acid, as described above, in a quantity sufficient to materially reduce the pH of the pulp to a pH within the range of about pH 4 to about pH 6.3 to eliminate by precipitation undesired impurities. While phosphoric acid is preferred because it gives consistently good results in eliminating impurities and does not give undesirable properties to the syrups, such as bad taste, other acids may be used for part or all of the acidification but are not preferred because of their inferiority in one respect or another to phosphoric acid. Suitable acidic materials to use are acid defecating agents, that is, any acid which, when added in sufficient quantity under the pH conditions specified, will bring about the precipitation of impurities without introducing any undesirable radicals which require extra steps or extra care for their elimination. Acids, such as hydrochloric, acetic and sulphuric, have been used but none of these give as consistently good results as phosphoric acid.

After the pH has been adjusted to the proper point within the range from about pH 4 to about pH 6.3 by the addition of acid, the mixture is heated to a temperature in the range from between about 76° C. to about 100° C. for a short period of time to complete the reaction and bring about the precipitation of the maximum quantity of impurities. The precipitate formed is usually applesauce-like and is of a type which is very easily filtered. The heating does not have to be continued for any extended period after the material has reached the desired temperature and the precipitate has formed. The temperature may vary somewhat above and below the range given, although best results are obtained within this range. It has been found that in general the critical temperature at which a flocculent precipitation begins is about 73° C. Temperatures below 76° C. are thus contemplated.

After the reaction following the addition of phosphoric acid is completed by heating, as described above, further quantities of the alkaline material, preferably the same alkaline material previously added, for example, an aqueous solution of lime, are added to again increase the pH materially and to precipitate out of the solution any substantial quantity of impurities which may remain, including those originally present as well as those added in the form of reagents. It will be found that there is another optimum point, in the neighborhood of about pH 6.3, at which a reaction occurs and a further precipitate is formed, and preferably the addition of alkaline material is discontinued when this pH is reached to allow time for this reaction to be completed. Preferably, the pH is then raised further by continued addition of the alkaline material to a final optimum point lying between about pH 6.7 and about pH 8.7, where any surplus lime or other alkaline reagent is precipitated and a filtrate of clarity and maximum purity is attained, and the whole mixture is then brought to a boil and is ready for separation of fruit pulp and precipitated impurities. Both of the optimum points occurring during the final addition of the alkaline material in accordance with the preferred procedure may be determined by simple test, as described hereinafter, in the same manner that the other optimum points are.

The heating of the mixture to boiling after it has been adjusted to the final pH is preferred in order to insure maximum elimination of impurities, but the boiling need not be continued for any substantial period of time.

Filtration of the mass after addition of the reagents and completion of the reactions, as described above, is readily accomplished in any of a variety of filtering devices, such as a filter press, a centrifuge, an Oliver type vacuum filter precoated with a filter medium, or with plain equipment. Preferably, the resulting filtrate is then run over a bag filter to take out any minor particles which may be carried through due to leaky filtering mediums. The resulting filtrate is a sweetening medium in the form of a clear syrup and, with or without the further treatment described hereinafter as preferred, is ready for use.

Some materials of this type, particularly those imparting color, are usually present in the clear filtrate from the filtration step last described above. Preferably, therefore, this clear filtrate is treated with animal bone char or any activated carbon whereby any coloring materials and any materials imparting odor and flavor which may still be present are removed. The clear filtrate is ordinarily substantially neutral although its pH is not exactly 7.

The clear filtrate or sweetening medium may also be concentrated to any desired extent but concentration preferably, but not necessarily, follows the treatment with bone char or carbon.

In accordance with the preferred method, as described above, the alkaline material is added to the fruit material first and the acidic material is added later. However, due to the fact that a low pH is not objectionable during treatment, the acidic material may be added prior to the addition of the alkaline material, if desired. The addition of the acidic material prior to the addition of the alkaline material is not preferred because more acidic material is required when it is added first and the preferred phosphoric acid is more expensive than the preferred alkaline material, lime. The addition of the alkaline material first is also preferable since it makes control of the process easier.

To determine the optimum or preferred pH to which the fruit material is to be raised in the initial treatment with alkaline material, such as lime, a small sample of the fruit material is ground and enough inert filtering aid is added to facilitate juice extraction. The mixture is then pressed for extraction of a sample of the juice. The sample of juice is divided into several small portions, the first of which is analyzed for total sugars purity and natural existing pH. The alkaline reagent solution to be used is then added to the remaining divided portions in amounts increasing progressively with each successive portion so that the pH to which each successive portion is raised is 0.5 pH higher than the preceding one. From the standpoint of impurity elimination alone, the best pH to which to increase the mixture is that at which a maximum of impurities is precipitated, but it will be noted, as the pH is increased, that there is a point at which substantial darkening of the juice occurs, which darkening increases with further increases in pH. This darkening is undesirable because it very materially increases the cost of color elimination and accordingly it has been found to be preferable not to increase the pH of the mixture above the pH where substantial darkening occurs, even though further elimination of impurities may take place at such higher pH. In other words, the preferred pH is the pH within the range specified which is just below that where substantial darkening occurs or which is the pH where the maximum amount of impurities is precipitated, whichever of these two is lower. The addition of the alkaline material, as described above, to successive small portions of the juice is therefore continued until a point is reached where the quantity of alkaline material added is such as to produce a substantial darkening of the juice. Inspection of the various samples will then indicate the proper pH to which to increase the pH of the material undergoing treatment, in accordance with principles outlined above.

The optimum or preferred pH determined as above is preferably used in all cases except those previously noted where at this optimum a substantial proportion of the juice cells are not cracked, and thus lock in acids at this stage which are freed subsequently to give the final product a pH which is lower than that required for the maximum increase in sugars purity. In such exceptional cases the pH is preferably raised initially to the point where substantially all the juice cells are cracked. It may be determined whether the juice cells are substantially all cracked at the optimum pH, for example, by carrying a small batch of the fruit through the complete treatment and observing the result or by increasing the pH of a small batch to the optimum and pressing. In the latter case the presence of substantial number of uncracked cells will be indicated by an excessive difference between the pH of the expressed juice and the pH of the fruit before pressing.

The pH to which the fruit material is next reduced by acidification depends to some extent at least upon the pH to which the material is raised in the initial treatment with alkaline material, and the preferred pH to which to acidify is conveniently determined in substantially the manner just described. To this end, after the pH to which to increase the fruit material with alkaline material is determined a larger portion of the juice is adjusted to this pH and is in turn separated into several small portions. The acid solution to be used, for example, an aqueous phosphoric acid solution, is then added in progressively increasing amounts to successive ones of these samples, starting with an amount which reduces the pH of the first portion at least to pH 6.3 if the preferred alkaline pH is higher, and progressively increasing the amount so as to reduce the pH by 0.2 progressively in the succeeding portions. Each portion is heated to about 76° C. or above, following adjustment of the pH, and is maintained at this temperature for a short time until the reaction is complete, as outlined above. Successive samples are treated as described until a pH is reached at which on heating to 76° C., as described, an applesauce-like precipitate is obtained. The pH of this sample is then the correct pH to which to acidify the particular lot of fruit material from which the sample is taken.

Having determined the pH to which to acidify the material, another fair sized portion of juice is treated with alkaline material to the preferred pH, as determined in the first test described above. The pH of this sample is then reduced with the acidic material to the second pH determined as described above, and the mass is thereupon heated to 76° C. for a sufficient time to complete the reaction. This mixture is then subdivided into various smaller portions and the alkaline material, in the form of an aqueous solution, is then added to successive ones of these portions in amounts increasing progressively so as to produce in succeeding ones of the portions a pH which is .02 higher than the pH of the preceding portion. This is continued until a pH is reached at which a further reaction occurs. This is ordinarily about pH 6.3. When this point is reached time is allowed for the reaction to go to completion, and alkaline material is added to the remaining portions in the amount required to increase them to this pH. When the reaction at this pH is complete in these various portions further quantities of alkaline material are then added to these remaining portions in amounts increasing progressively in succeeding portions so as to give them a pH which is 0.5 higher than the preceding portion. This is continued until a pH is reached at which, upon bringing the mixture to a boil and filtering, maximum sugars purity is attained, that is, at which the highest percentage of dissolved solids is sugars. The pH at which this occurs is the optimum final pH. To determine which of the samples shows a maximum sugars purity, the filtrates from the various samples are analyzed for total dissolved solids and total dissolved sugars, the sugars purity being the percentage of dissolved solids which is sugars.

It is, of course, preferable to add to any batch of fruit just the quantities of reagents required to give the optimum pH's determined, as described above. The invention is not, however, intended to be limited to the use of the optimum conditions but instead contemplates broadly the processing of fruit in accordance with the broad description. Moderate variations from the optimum points do not greatly affect the results and accordingly a standard set of conditions may be applied to all of a considerable number of fruit materials.

In order to better illustrate the invention, a flow diagram is shown in the accompanying drawing. The flow diagram is that of a layout for treating sugar bearing materials according to one embodiment of the present invention. It will be understood that it is given merely by way of illustration and that the invention is not to be construed as liimited thereto.

Fruit material, whole and/or waste, and derived from a single fruit or a plurality of fruits, is introduced into a brush type pulper 10 through a hopper 12. This fruit material may or may not have been put through a grinder prior to its introduction into the pulper 10. Valved line 14 is provided to introduce water into the pulper 10, and through valved line 16 lime water may be introduced. In the brush type pulper 10 the fruit material is ground to a sufficient fineness and the skins, seeds, cores, et cetera, are separated from the juice and flesh portions of the fruit. Water is supplied to the pulper through the valved line 14 in sufficient quantity to facilitate satisfactory operation of the pulper 10. Lime water may also be introduced through line 16 to aid in breaking the pulp and promoting the flow of the juice and pulp mixture out of the pulper through line 18. The fruit material freed of the skins, seeds, cores, et cetera, leaves the pulper through the line 18 and passes into the defecator tanks 20 through the lines 22.

Each of the defecator tanks 20 is provided with a trough 24 through which fruit material may be introduced directly without passing through the pulper 10. As indicated above, certain fruit material which may be treated in accordance with this invention does not necessarily have to be passed through the brush type pulper. It may be ground separately and introduced directly into the defecator tanks 20.

Each of the defecator tanks 20, in addition to the supply lines 22, is provided with a valved acid supply line 26 and a valved lime water supply line 28. The acid supply lines 26 are connected through pipe 30 to an acid storage tank 32 containing a six per cent aqueous solution of phosphoric acid. In like manner the lime water supply lines 28 are connected through a pipe 34 to a lime water storage tank 36 containing a six per cent aqueous solution of lime. It will be noted that the line 34 also serves to connect the valved line 16 to the lime water supply tank 36.

The concentration of this lime water supply may be considerably less than six per cent, depending upon the quantity of water present in the fruit material as it is introduced into the defecator tanks 20 through the lines 22. Where the fruit material introduced into the tanks 20 contains an adequate quantity of water, the six per cent solutions of both lime and acid are preferred since they give a good distribution of the reagents through the treated material and do not at the same time involve the introduction of excessive quantities of water along with the desired reagents. As indicated above, however, both more concentrated or more dilute solutions may be used, if desired, so long as the pH of the treated material is controlled as described hereinafter. Preferably, the lime and the acid reagent solutions will have concentrations which do not materially exceed ten per cent, in order to avoid local high concentrations of reagent.

Although the concentrations of the solutions of alkaline material and acidic material have been discussed together and with particular reference to lime and phosphoric acid, it will be understood that in any given batch it is by no means essential that the lime and acid solutions be of the same, or even approximately the same, strength. Furthermore, the above discussion of the concentrations which particularly refers to lime and phosphoric acid is intended to be representative with respect to other alkaline and acidic materials. Appropriate concentrations of other acidic materials and other alkaline materials will be readily apparent to those skilled in the art or can be readily determined by a simple test.

In the defecator tanks 20 the fruit material, whether introduced through the lines 22 or the troughs 24, is first treated with lime water supplied through lines 28 to raise the pH of the mixture to a pH in the range between about pH 4 and about pH 8.7 and preferably to the pH within this range below about pH 7 which has been previously determined by test, as described above, to give the best elimination of impurities or to the pH where substantially all the juice cells are cracked. Suitable agitation is provided in each of the tanks 20 to insure thorough mixing of the fruit material and added reagents. After the proper quantity of lime water has been introduced and thoroughly mixed with the fruit material, the phosphoric acid solution is then supplied to each of the tanks 26 until the pH is reduced to a pH within the range from about pH 6.3 to about pH 4 and preferably to about the pH within this range shown by previous test to be best for the batch undergoing treatment.

When the acid solution has all been added and thoroughly distributed in the mixture in the tanks 20 by suitable agitation, the whole mass in the tanks 20 is heated up to a temperature from about 76° C. to about 100° C., preferably about 80° C. This is accomplished by suitable heating means (not shown) which is associated with each of the defecator tanks 20. Upon heating the material in the defecator tanks 20 in this manner a precipitate which is applesauce-like separates out, as described above. The heating does not need to be continued for any substantial period of time after the proper temperature has been reached.

When the reaction has been completed by heating additional lime water is admitted through the lines 28 to again increase the pH of the mixture in the tanks 20. The mixture is thoroughly agitated during the addition of the lime water and the addition is continued until the mixture is increased to a pH in the neighborhood of about pH 6.3 at which another reaction occurs. Preferably this pH has been previously determined by test and when it is reached the addition of the lime water is temporarily discontinued until the reaction is completed. Upon completion of this reaction the addition of lime water is resumed and continued until still further quantities of impurities are precipitated. Preferably, the addition is stopped when a pH (previously determined by test) is reached at which when the mass is heated to a boil and filtered the filtrate shows the maximum sugars purity.

When all the lime water has been added the mixture in the tanks 20 is again heated, this time to the boiling point in order to insure completion of all the reactions. This heating does not need to be continued for any substantial period of time after the boiling temperature has been reached.

The mixture is now ready to be filtered and to this end the liquid and solid material in the defecator tanks 20 is drawn off through the valved lines 38 into the filter press 40. Clear filtrate separated in the press 40 passes through line 42 into the bag filter 44 which takes out any minor particles which may be carried through the filter press due to leaky filtering media. The filter cake remaining in the press 40 is preferably washed to remove any small amount of sugary liquid remaining therein. Wash water for this purpose may be introduced through the valved line 46. If desired, the pH of the wash water entering through line 46 may be adjusted to approximately the pH of the filtrate in order to avoid redissolving any precipitated impurities. The washing is preferably continued until the wash water leaving the press 40 contains less than about one per cent sugars. This wash water leaves the filter press 40 through the line 42 and passes through the bag filter 44 to wash out any of the filtrate which may remain in this filter. The thoroughly washed cake is removed from the press 40, together with any particles accumulated in the bag filter 44, and after drying or any other desired treatment it is disposed of for fertilizer or other uses for which it is suited.

The wash water from washing the material filtered out in press 40 and bag filter 44 is ordinarily added to the clear filtrate leaving the bag filter 44 through the line 48. The clear liquid passing through line 48 is now substantially free from impurities and when decolorized and/or concentrated, if necessary, is ready for use as a packing medium for fruits or for other purposes for which sweetening media are suited. If it contains a substantial quantity of coloring matter or of matter imparting a characteristic odor or flavor, it is preferably passed through the valved line 48 into the charcoal filter 50. After it leaves the charcoal filter 50, if it is not to be concentrated, it may be drawn off through the valved line 52 and sent to the cannery or to storage. When it is to be concentrated, it is passed through the valved line 54 into the evaporator 56 where a portion of the water content is eliminated.

Instead of adding the wash water or "sweet water" from press 40 and bag filter 44 to the clear filtrate, this "sweet water" may be added to a fresh batch of fruit material to be processed in place of water which would be added to provide enough water to dissolve all the sweetening ingredients of the fruit. In this way the sugar content of the "sweet water" is not lost and the filtrate is not diluted.

Also the combined filtrate and wash water from the filter 44, instead of being first decolorized in the charcoal filter 50, may, if desired, be passed directly to the evaporator 56 through the valved line 58. This is sometimes desirable, particularly if the liquid leaving the filter 44 contains very little color or if it is likely to acquire color during the evaporation step. Due to the fact that the liquid may acquire color in the evaporator 56 or may not have been decolorized prior to evaporation, a second charcoal filter 60 is provided to which the concentrated liquid from evaporator 56 may be passed by valved line 62. The valved line 64 is provided so that the concentrated liquid from the evaporator 56 may be passed directly to the cannery for use or to storage instead of passing through the charcoal filter 60. The decolorized liquid leaving the charcoal filter 60 may pass either of two ways, going to the cannery through the valved line 66 or to the storage tank 68 through the valved line 70.

The process shown in the above flow diagram leads to production of a sweetening medium in the form of a syrup and does not include any steps for recovering sugar in crystalline form. The evaporation may, however, as pointed out above, be continued in an appropriate apparatus until pure crystalline sugar is obtained. This treatment is conventional, however, and need not be described in detail.

To further facilitate understanding of the improved sugar extraction method disclosed herein, the following detailed example is given in which the parts are parts by weight unless otherwise indicated. These examples are to be construed as merely illustrative and not as limiting the scope of the invention.

*Example*

2000 pounds of a mixture including about 75% by weight of pears and 25% by weight of peaches and sufficient water to insure substantially complete extraction of the sweetening ingredients were ground to a fine juicy pulp, and the skins, seeds, cores, et cetera, were separated in a brush type pulper. The juice and pulp remaining which contained the sweetening ingredients were then passed into a tank provided with an agitator and with means for heating it. Lime, in the form of a 10° Brix aqueous solution or suspension, was then added, the mixture being simultaneously agitated until the pH of the mixture was increased to pH 7.6, indicated by previous test, as described above, to be the optimum pH to which to lime originally.

The pH of the mixture was then reduced to pH 5.2 (the optimum previously determined) by the addition of a sufficient quantity of a 10° Brix aqueous solution of phosphoric acid, the mixture being agitated during the addition of the acid to provide uniform distribution of the reagent throughout the mass. Upon completion of the addition of the acid, the mixture was heated to about 80° C. for a short time to complete the reaction and throw down an applesauce-like precipitate.

Without separating this precipitate the mixture was agitated and more of the aqueous lime was added until the pH had increased to pH 6.3, at which pH a further reaction took place, as indicated by the test samples. This reaction being completed, the addition of the aqueous lime was continued, as well as the agitation, until the mixture had a pH of 7.2 at which pH the test samples showed that a filtrate of clarity and maximum sugars purity was obtained.

The mixture was then brought to a boil and was filtered in a filter press, the clear filtrate from the filter press being then passed through a bag filter to remove any minor solid particles which might have passed through the press due to a leaky filtering medium. The filter cake in the press was then washed with water until the washings coming through contained less than one per cent sugars, and these washings, after passing through the bag filter, were added to the clear filtrate. The filter cake was removed and dried for disposition as fertilizer or for other purposes. The clear filtrate, together with the washings, was decolorized over bone char in the conventional manner to provide a sweetening medium in the form of a clear, substantially water-white syrup which could be further concentrated or used as such.

The 2,000 pounds of pears and peaches originally contained 13 per cent of sugars or 260 pounds, as indicated by analysis of a sample of expressed juice. This analysis also showed that the sugars in the expressed juice had an initial purity of 69 per cent or, in other words, 69 per cent of the total solids dissolved in the juice was sugars. Analysis of the final syrup product disclosed that it contained about 13.8 per cent of dissolved solids, including about 10.39 per cent sugars, so that it had a sugars purity of 75.3 per cent. The 10.39 per cent sugars consisted of 9.45 per cent invert sugar and 0.94 per cent sucrose. Not only is the resulting syrup of very high purity but, in addition, the efficiency of the sugar extraction is excellent. From the 2,000 pounds of pears and peaches, 232 pounds of the sugars were recovered in the syrup which, as indicated, had a purity of 75.3 per cent. The sugar extracted by the process is thus 89 per cent of the total present in the original pears and peaches.

The term "sweetening medium" is used repeatedly herein, and in the light of the foregoing explanation it will be understood that it means just what the name signifies, i. e., a sugar containing medium which is substantially free of materials which detract from the sweetening power of the sugars present, such as acids and ash-forming materials, although it may contain substantial quantities of inert diluents.

"Sugars purity," as used herein, is expressed in terms of the quantity of sugars as related to the total solid materials in solution with the sugars in a common solvent.

The advantages of the present invention will be apparent from the foregoing description in large part. One of the chief merits of the process is that it is simple and inexpensive to carry out and is thus very practical from the economic standpoint.

These economies in operation are accomplished, moreover, without any substantial decrease in the purity of the final product, provided the percentage of impurities in the raw material is not excessive, as indicated above.

Still another advantage of the process is that the percentage of sugar recovered from the fruit material in a useful form is exceedingly high, very little sugar being left behind in the filter cake or destroyed in the purification operations.

It is apparent that many widely different embodiments of this invention may be made without departing from the spirit and scope thereof, and therefore it is not intended to be limited except as indicated in the appended claims.

The invention is hereby claimed as follows:

1. In the process of preparing a sweetening medium from fruit, the steps which comprise adding an alkaline defecating agent to a composition comprising both the liquid and flesh portions of the fruit, said alkaline material being added in a quantity sufficient to substantially increase the pH of the fruit composition to a pH within the range from about pH 4 to about pH 8.7 and react with undesired impurities, then adding an acid defecating agent, said fruit being ground to a fine pulp at least prior to the addition of said acidic material, and said acidic material being added in sufficient quantity to materially reduce the pH of the pulp to a pH in the range from about pH 4 to about pH 6.3 and in cooperation with said alkaline material to precipitate out undesired impurities in the form of an easily filterable and washable precipitate, thereafter heating the mixture to a temperature above about 73° C. to form said precipitate and separating the treated composition into a clear liquid and insoluble solid material.

2. In the process of preparing a sweetening medium from fruit, the steps which comprise adding an alkaline defecating agent to a composition comprising both the liquid and flesh portions of the fruit, said alkaline material being added in a quantity sufficient to react with undesired impurities and substantially increase the pH of the composition to a pH within the range from about pH 4 to about pH 8.7 at which substantially all the juice cells are cracked with a minimum of darkening of the composition, then adding an acid defecating agent, said fruit being ground to a fine pulp at least prior to the addition of said acidic material, and said acidic material being added in sufficient quantity to materially reduce the pH of the pulp to a pH in the range from about pH 4 to about pH 6.3 and in cooperation with said alkaline material to precipitate out undesired impurities in the form of an easily filterable and washable precipitate, and thereafter heating the mixture to a temperature above about 73° C. to form said precipitate and again raising the pH of the mixture with additional quantities of divalent alkaline material to a pH in the range from about pH 6.7 to about pH 8.7 where still further quantities of impurities are precipitated out, and separating the resulting mixture into a clear liquid and insoluble solid material.

3. In the process of preparing a sweetening medium from fruit, the steps which comprise adding an alkaline defecating agent to a composition comprising both the liquid and flesh portions of the fruit, said alkaline material being added in a quantity sufficient to increase the pH of the composition to substantially the pH within the range from about pH 4 to about pH 8.7 at which a maximum of impurities react and substantially all the juice cells are cracked with a minimum of darkening of the composition, then adding an acid defecating agent, said fruit being ground to a fine pulp at least prior to adding said acidic material and said acidic material being added in sufficient quantity to reduce the pH of the pulp to substantially the pH in the range from about pH 4 to about pH 6.3 at which a maximum of impurities is precipitated in the form of an easily filterable and washable precipitate, thereafter heating the mixture to a temperature above about 73° C. to form said precipitate and separating the treated composition into a clear liquid and insoluble solid material.

4. In the process of preparing a sweetening medium from fruit, the steps which comprise adding an alkaline earth metal oxide to a composition comprising both the liquid and flesh portions of the fruit, said alkaline earth metal oxide being added in a quantity sufficient to react with undesired impurities and increase the pH of the composition to a pH within the range from about pH 4 to about pH 8.7 at which substantially all the juice cells are cracked with a minimum of darkening of the composition, then adding an acid defecating agent, said fruit being ground to a fine pulp at least prior to the addition of said acidic material and said acidic material being added in sufficient quantity to materially reduce the pH of the pulp to a pH in the range from about pH 4 to about pH 6.3 and in cooperation with said alkaline material to precipitate out undesired impurities in the form of an easily filterable and washable precipitate, thereafter heating the mixture to a temperature above about 73° C. to form said precipitate and separating the treated composition into a clear liquid and insoluble solid material.

5. In the process of preparing a sweetening medium from fruit, the steps which comprise adding an alkaline earth metal hydroxide to a composition comprising both the liquid and flesh portions of the fruit, said alkaline earth metal hydroxide being added in a quantity sufficient to react with undesired impurities and increase the pH of the composition to a pH within the range from about pH 4 to about pH 8.7 at which substantially all the juice cells are cracked with a minimum of darkening of the composition, then adding an acid defecating agent, said fruit being ground to a fine pulp at least prior to the addition of said acidic material and said acidic material being added in sufficient quantity to materially reduce the pH of the pulp to a pH in the range from about pH 4 to about pH 6.3 and in cooperation with said alkaline material to precipitate out undesired impurities in the form of an easily filterable and washable precipitate, thereafter heating the mixture to a temperature above about 73° C. to form said precipitate and separating the treated composition into a clear liquid and insoluble solid material.

6. In the process of preparing a sweetening medium from fruit, the steps which comprise adding an alkaline defecating agent to a composition comprising both the liquid and flesh portions of the fruit, said alkaline material being added in a quantity sufficient to substantially increase the pH of the fruit composition to a pH within the range from about pH 4 to about pH 8.7 and react with undesired impurities, then adding phosphoric acid in sufficient quantity to materially reduce the pH of the composition to a pH in the range from about pH 4 to about pH 6.3 and in cooperation with said alkaline material to precipitate out undesired impurities in the form of an easily filterable and washable precipitate, thereafter heating the mixture to a temperature above about 73° C. to form said precipitate and separating the treated composition into a clear liquid and insoluble solid material, said fruit being ground to a fine pulp at least prior to the addition of said phosphoric acid.

7. In the process of preparing a sweetening medium from fruit, the steps which comprise adding lime to a composition comprising both the liquid and flesh portions of the fruit, said lime being added in a quantity sufficient to substantially increase the pH of the fruit composition to a pH within the range from about pH 4 to about pH 8.7 and react with undesired impurities, then adding phosphoric acid in sufficient quantity to materially reduce the pH of the composition to a pH in the range from about pH 4 to about pH 6.3 and in cooperation with said lime to precipitate out undesired impurities in the form of an easily filterable and washable precipitate, thereafter heating the mixture to a temperature above about 73° C. to form said precipitate and separating the treated composition into a clear liquid and insoluble solid material, said fruit being ground to a fine pulp at least prior to the addition of said phosphoric acid.

8. In the process of preparing a sweetening medium from fruit, the steps which comprise adding lime to a composition comprising both the liquid and flesh portions of the fruit, said lime being added in a quantity sufficient to react with undesired impurities and substantially increase the pH of the composition to a pH within the range from about pH 4 to about pH 8.7 at which substantially all the juice cells are cracked with a minimum of darkening of the composition, then adding phosphoric acid in sufficient quantity to materially reduce the pH of the composition to a pH in the range from about pH 4 to about pH 6.3 and in cooperation with said lime to precipitate out undesired impurities in the form of an easily filterable and washable precipitate, thereafter heating the mixture to a temperature above about 73° C. to form said precipitate and again raising the pH of the mixture with additional quantities of said lime to a pH in the range from about pH 6.7 to about pH 8.7 where still further quantities of impurities are precipitated out and separating the resulting mixture into a clear liquid and insoluble solid material, said fruit being ground to a fine pulp at least prior to the addition of said phosphoric acid.

9. In the process of preparing a sweetening medium from fruit, the steps which comprise adding lime to a composition comprising both the liquid and flesh portions of the fruit, said lime being added in a quantity sufficient to increase the pH of the composition to substantially the pH within the range from about pH 4 to about pH 8.7 at which a maximum of impurities react and substantially all of the juice cells are cracked with a minimum of darkening of the composition, then adding phosphoric acid in sufficient quantity to materially reduce the pH of the composition to substantially the pH in the range from about pH 4 to about pH 6.3 at which a maximum of impurities is precipitated in the form of an easily filterable and washable precipitate, and then heating the mixture to a temperature in the range from about 76° C. to about 100° C. for a short time to complete the reaction and form said precipitate and separating the treated composition into a clear liquid and insoluble solid material, said fruit being ground to a fine pulp at least prior to the addition of said phosphoric acid.

10. In the process of preparing a sweetening medium from fruit, the steps which comprise mechanically separating the liquid and flesh portions of the fruit from the remainder of the fruit and particularly from the skins, seeds and cores, and grinding the liquid and flesh portions of the fruit to a fine pulp without subjecting said fruit material to substantial mechanical pressure, adding lime to said fine pulp in a quantity sufficient to increase the pH of said fine pulp to substantially the pH within the range from about pH 4 to about pH 8.7 at which a maximum of impurities react and substantially all the juice cells are cracked with a minimum of darkening of the composition, then adding phosphoric acid in sufficient quantity to materially reduce the pH of the composition to substantially the pH in the range from about pH 4 to about pH 6.3 at which a maximum of impurities is precipitated in the form of an easily filterable and washable precipitate, then heating the mixture to a temperature in the range from about 76° C. to about 100° C. for a short time to complete the reaction, thereafter again raising the pH of the mixture with additional quantities of lime to a pH in the range from about pH 6.7 to about pH 8.7 where still further quantities of impurities are precipitated out, heating the mixture at this pH to a boil to complete the formation of the precipitate, and separating the resulting mixture into a clear liquid and insoluble solid material.

ARVID M. ERICKSON.
JOHN D. RYAN.